(12) United States Patent
Xu et al.

(10) Patent No.: US 8,862,569 B2
(45) Date of Patent: Oct. 14, 2014

(54) METHOD AND TECHNIQUES FOR DETERMINING CRAWLING SCHEDULE

(75) Inventors: Cheng Xu, San Jose, CA (US); Qiying Lin, Guangzhou (CN); Xin Li, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/348,438

(22) Filed: Jan. 11, 2012

(65) Prior Publication Data

US 2013/0179424 A1  Jul. 11, 2013

(51) Int. Cl.
*G06F 17/30* (2006.01)

(52) U.S. Cl.
USPC .......................................... 707/710; 715/206

(58) Field of Classification Search
USPC ......... 707/709, 710, 721, 722, 749, 750, 751, 707/758, 662, 664, 669, 689, 692, 812, 813, 707/816, 817, 821, E17.108, 705, 706, 708; 705/1.1, 14.4, 14.53, 14.6, 14.61
See application file for complete search history.

(56) References Cited

U.S. PATENT DOCUMENTS

| | | | | |
|---|---|---|---|---|
| 7,676,553 | B1* | 3/2010 | Laucius et al. | 709/219 |
| 2005/0256860 | A1* | 11/2005 | Eiron et al. | 707/4 |
| 2009/0132524 | A1* | 5/2009 | Stouffer et al. | 707/5 |
| 2011/0196821 | A1* | 8/2011 | Hellerman et al. | 707/600 |
| 2011/0225586 | A1* | 9/2011 | Bentley et al. | 718/101 |
| 2012/0047122 | A1* | 2/2012 | Hauser | 707/709 |
| 2012/0109941 | A1* | 5/2012 | Cohen et al. | 707/722 |
| 2012/0259833 | A1* | 10/2012 | Paduroiu | 707/709 |
| 2013/0144858 | A1* | 6/2013 | Lin et al. | 707/709 |

* cited by examiner

*Primary Examiner* — Greta Robinson

(57) ABSTRACT

Methods, systems and computer-readable storage medium for determining a crawling schedule. In an aspect, a method includes obtaining crawl history data for a Web site having Web pages, determining a status of the Web pages, determining a total quantity of Web pages that have a status of deleted, calculating a probability that another Web page of the Web site will be removed based on the total quantity, and storing data associating the calculated probability with the Web site. The method can further include determining, for a plurality of sets of the previous time periods, a respective crawl penalty as a combination of a penalty for crawling the Web site and a penalty for showing a deleted Web page based on the calculated probability, and determining a re-crawl schedule based on the crawl penalties.

20 Claims, 8 Drawing Sheets

METHOD AND TECHNIQUES FOR DETERMINING CRAWLING SCHEDULE

FIELD OF INVENTION

The following relates to a system, method, and computer-readable storage medium for determining a crawling schedule.

BACKGROUND

Many Web sites organize information in one or more Web documents into categories, where some categories may relate to lists of sub-categories. For example, classified-ads Web sites organize ads as a directory having a hierarchy of categories and sub-categories. In classified-ads Web sites, some categories group a set of one or more listings of ad postings for products, services, or other virtual content. Typically, the hierarchy of categories and ad postings within the categories may be contained in one or more listing page(s). Ad postings listed in the listing pages can be contained in their own posting page. Ad postings contained in their own posting page are referred in listing pages by links to the posting pages. Posting pages may include an ad posting for a product or service referred to by a label for the corresponding link.

As another example, products-related Web sites organize products into categories and sub-categories. Product categories and sub-categories may be grouped as a hierarchy of categories, where some categories group a set of one or more listings of products. A product may be described in its own product page.

A crawling service can crawl and extract ad postings from the various classified-ads information Web sites. The crawling service stores ad postings, indexed by a classification category and Web sites. The index of ad postings can be searched. Ad postings in the indexed postings may expire and may be deleted in the Web sites.

A problem that can occur is that posting pages that have been deleted from their respective Web site, may continue to exist in the indexed ad postings. Subsequently, posting pages that no longer exist in a source Web site may still be found as a result of a search in the index of ad postings.

A solution to the problem of a discrepancy between Web sites that have deleted posting pages while the indexed ad postings still contain the respective ad posting, has been to re-crawl the Web sites in order to determine whether a posting page may have been deleted from a Web site. If re-crawling determines that a posting page has expired or has been deleted from a Web site, the ad posting is deleted from the index of ad postings. A problem with this solution has been that, extensive re-crawling effort takes up network bandwidth that could instead be used for end user-oriented tasks. Furthermore, re-crawling can substantially slow the response time of the Web site being re-crawled.

In other words, not re-crawling web sites enough can lead to an index of posting pages containing ad postings corresponding to posting pages that have been deleted from their respective Web sites. Re-crawling too much can lead to over-burdening the communications bandwidth and can affect response rates of the re-crawled web sites.

BRIEF SUMMARY

This document describes determining crawling schedule for Web sites. Types of Web sites can include classified ads Web sites or products-related Web sites. Web pages of Web sites are stored in an indexed storage of a crawling service. There may be discrepancies between Web pages stored in the indexed storage and the actual Web site. A crawling schedule is determined that seeks to minimize disruption of the actual Web site and network bandwidth, but ensure that the Web pages in the indexed storage accurately reflect the actual Web site.

An aspect is an embodiment for a method performed by one or more processors that includes obtaining crawl history data for a Web site, wherein the Web site comprises one or more Web pages, determining a status of one or more of the Web pages of the Web site from the crawl history data, determining a total quantity of Web pages of the Web site that have a status of deleted, calculating a probability that another Web page of the Web site will be removed based on the total quantity of the Web pages that have a status of deleted, and storing data associating the calculated probability with the Web site. Other embodiments of this aspect include corresponding systems and computer program products.

A further aspect is categories of Web pages, where Web pages are posting pages. Another embodiment for a method includes obtaining a category of the posting pages, determining a total quantity of posting pages that have a status of deleted for a respective category, and calculating a probability that the Web site will remove a posting page for each of the respective categories. The probabilities of the respective categories are aggregated, and data associating the aggregate probability with the Web site is stored. The Web page can be a posting page for a product or service, where the product or service appears in a listing page among products or services of the same type.

A further aspect is an embodiment for a method performed by one or more processors that includes obtaining crawl history data for a plurality of previous time periods for a Web site, wherein the Web site comprises a plurality of Web pages, determining a status of each of the plurality of Web pages for each of the previous time periods, determining, for each previous time period, a total quantity of Web pages that have a status of deleted, calculating probabilities that other Web pages of the Web site will be removed within each respective re-crawl time period based on the total quantity of the Web pages that have a status of deleted, determining, for a plurality of sets of the previous time periods, a respective crawl penalty as a combination of a penalty for crawling the Web site and a penalty for showing a deleted Web page based on the calculated probability, and determining a re-crawl schedule based on the crawl penalties. The re-crawl schedule can be determined by selecting a set of the previous time periods among the plurality of sets of the previous time periods.

Another embodiment in which Web pages are posting pages and there are categories of posting pages includes obtaining a category of the posting pages, determining a total quantity of posting pages that have a status of deleted for a respective category, and calculating probabilities that other posting pages of the Web site will be removed within the respective re-crawl time periods for each of the respective categories.

These and other embodiments can optionally include one or more of the following features. The re-crawl schedule can be determined by selecting a set of the previous time periods having a minimum crawl penalty among the plurality of sets of the previous time periods.

These embodiments can be implemented to realize one or more of the following advantages. Using crawl history for status of Web pages results in accurate calculation of a probability that another Web page of a Web site will be removed. Using categories of posting pages results in further accuracy in determining a probability that another posting page will be removed. Determining a crawl penalty as a combination of a penalty for crawling the Web site and a penalty for showing a deleted posting page results in sufficiently re-crawling Web sites enough such that an index of posting pages does not contain ad postings corresponding to posting pages that have been deleted from their respective Web sites. At the same time, a burden of unnecessarily re-crawling Web sites to determine posting page deletion is alleviated. Also, appropriate time periods to conduct re-crawling are determined. Using categories of posting pages results in more accurate determination of appropriate time periods to conduct re-crawling.

These and other aspects are described in detail with respect to the drawings. Other features, aspects, and advantages of the subject matter will become apparent from the description, the drawings, and the claims.

BRIEF DESCRIPTION OF THE DRAWINGS

The accompanying drawings constitute part of this specification. In the drawings.

DETAILED DESCRIPTION

In order to alleviate a burden of unnecessarily re-crawling Web sites, according to a first aspect of the invention a prediction can be made to determine whether a web site will remove a page at a regular re-crawl time period based on crawling history. According to a second aspect, a determination can be made as to appropriate time periods (schedule) to conduct re-crawling.

Types of Web sites which can benefit from the disclosed techniques include, among other things, classified-ads Web sites and product-related Web sites. Classified-ads Web sites provide a service for posting advertisements. Classified-ads Web sites are similar to printed classified advertising, in that ads are grouped under headings classifying the product or service being offered. However, classified-ads Web sites also include posting pages for each individual ad. Information in an individual posting page is comparable to information presented in a printed classified ad, but can also show pictures and graphics. In addition, a typical posting page describes detailed information about a corresponding ad posting and information about the seller or service provider for the product or service. Product-related Web sites may also categorize products under headings.

Although the disclosed examples are for classified-ads Web sites, one of ordinary skill would understand that other types of Web sites in which Web pages can be identified for deletion can be handled by techniques disclosed herein. In other words, the description refers to posting pages, the same techniques can be applied to other types of Web pages.

The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. The present invention is not intended to be limited to the embodiments shown and the inventors regard their invention as any patentable subject matter described.

Figure 1A:
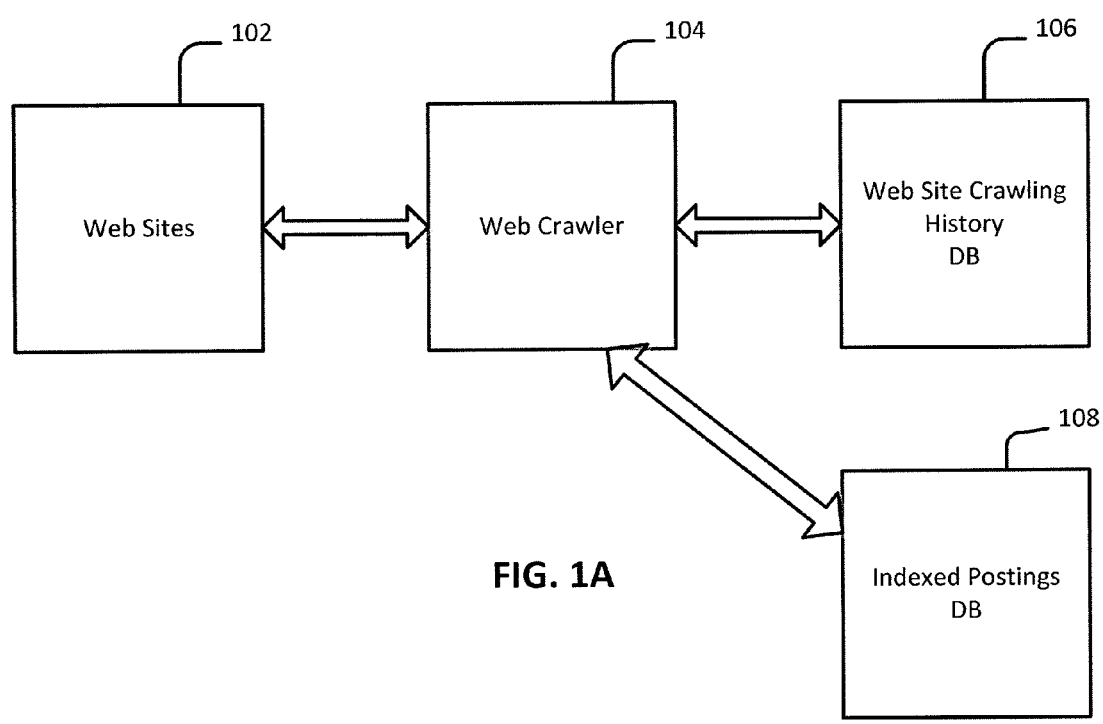
FIGS. 1A and 1B are example system block diagrams.

FIG. 1A shows a system block diagram in which a Web crawler 104 periodically crawls one or more Web sites 102 hosted by one or more Web servers. Upon crawling a Web site, an entry is made in a Web site crawl history database 106 and the status of postings are updated in the index of postings database 108. Web site crawl history database 106 maintains information of various types of Web sites and pages within Web sites, and maintains snapshots of crawled Web pages. A snapshot of a crawled Web page may include a response, or an error, code, page status and an associated timestamp. Error codes can be standard HTTP response codes. Page status can include NEW, DELETED, MODIFIED, or MOVED. The timestamp indicates the data and time that the Web crawler 104 discovered the page, or other document.

The Web site crawling history database 106 stores Web documents by document type that can include listing page, posting page, temporary page, and miscellaneous page. In addition, other information related to the Web documents may be stored, such as in-links (links to the URL of the document), out-links (links to other Web documents), clean text of the page, and category of content (such as a blog page, a travel page, a sports page).

The Web site crawl history database 106 maintains information on various categories of posting pages, some of which may be predetermined. The various categories are maintained as a category identification attribute for posting pages. The category identification can include a standardized set of categories typically found in classified ad Web pages, including, for example housing-rental, housing-sale, vehicle-cars, vehicle-trucks, and other predetermined types of categories, or categories generated from the Web pages as they are crawled.

Web sites typically have a home page. In some cases, Web sites may also contain an error page in the case that a posting no longer exists, or may contain a redirection to a new page when the URL has changed to a new Web site or Web page. A direction page may be a temporary page.

Figure 1B:
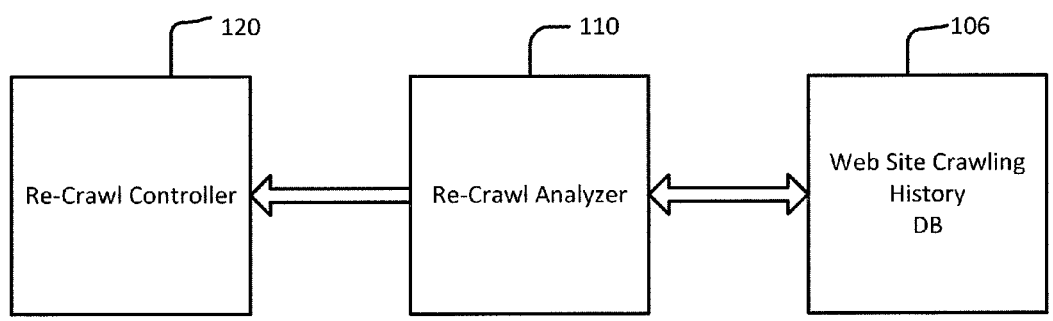

FIG. 1B is a system block diagram of components related to analysis of the Web site crawl history. The web site crawl history database 106 can be accessed by a re-crawl analyzer 110. The re-crawl analyzer performs analysis of crawl history data to aid in determining a probability that a Web site has deleted a posting page and in determining time periods when a Web site should be re-crawled, as will be described in more detail below. The re-crawl analyzer 110 provides results of analysis to a re-crawl controller 120. The re-crawl controller 120 determines when re-crawl operations are to be performed, performs re-crawling operation, and performs deletion of postings from the index of postings 108 based on re-crawling operation.

Figure 2:
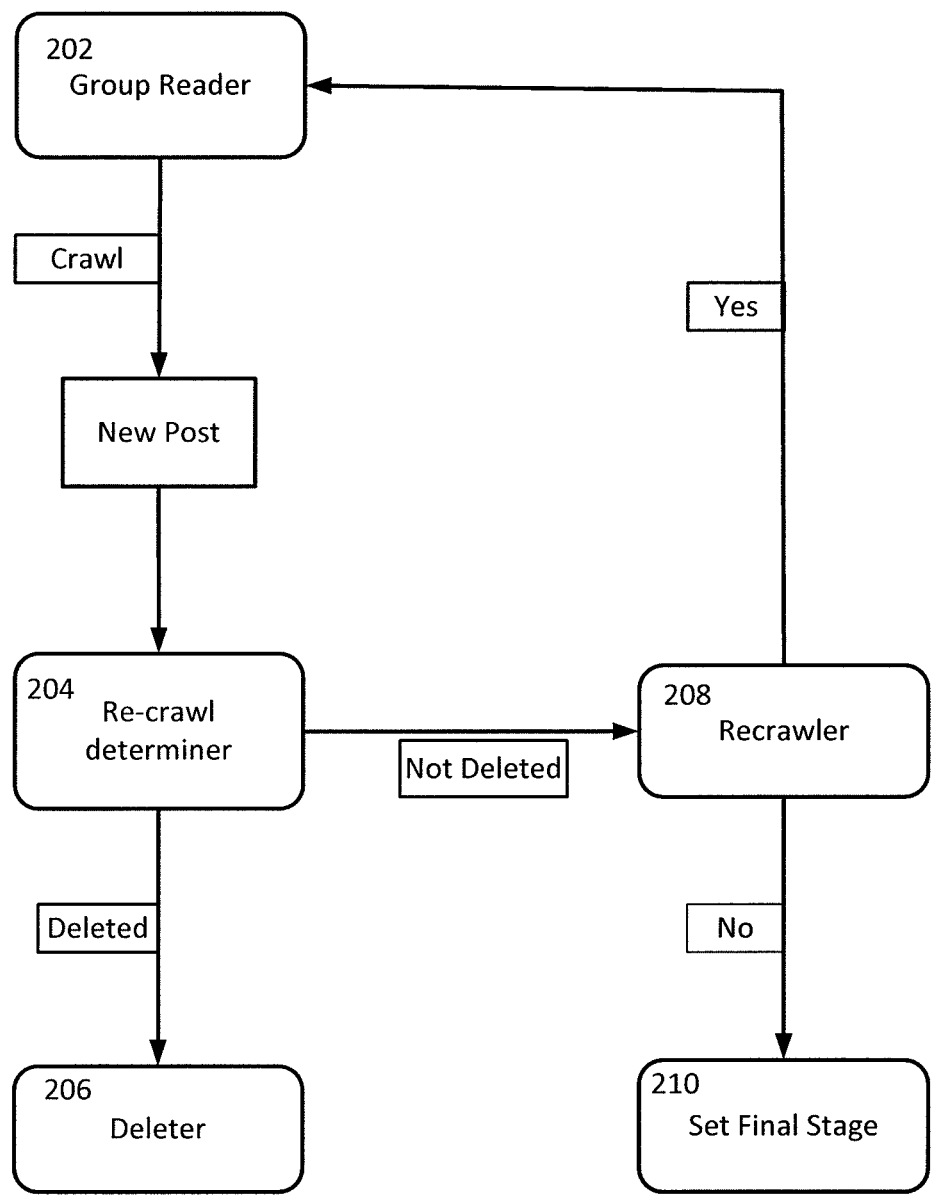
FIG. 2 is a data flow diagram showing a flow of information between operations of a re-crawling controller.

FIG. 2 is a dataflow diagram showing flow of information between operation components of the re-crawl controller 120. The re-crawl controller 120 includes a group reader 202, a re-crawl determiner 204, deleter 206, and re-crawler 208. A Group Reader 202 can obtain a list of URL's that should be re-crawled in the current time period. A re-crawl determiner 204 can determine whether a posting page is deleted, removed or modified from a Web site. A page may be removed from a Web site, by for example, removing a link to the page, without actually deleting the page from the server computer. In addition, a page may be substantially modified such that an original posting is changed to a new posting. For purposes of this disclosure a page that is substantially changed, or a page that has been removed, will be considered as being the same status as a deleted page. Re-crawl determiner 204 is capable of determining whether a posting page has been deleted based on a page status of DELETED for a posting page, where the page status can be obtained based on an HTTP response code. For example, if the HTTP code indicates that a page has not been found, the Re-crawl 204 determines that the posting page has been deleted. Alternatively, the page status can be obtained based on an analysis of the content of an HTML page. For example, if an HTML page content has a structure that indicates a redirection page (e.g., by comparison of Document Object Model—DOM), the Re-crawl determiner 204 determines that the posting page has moved.

Figure 4:
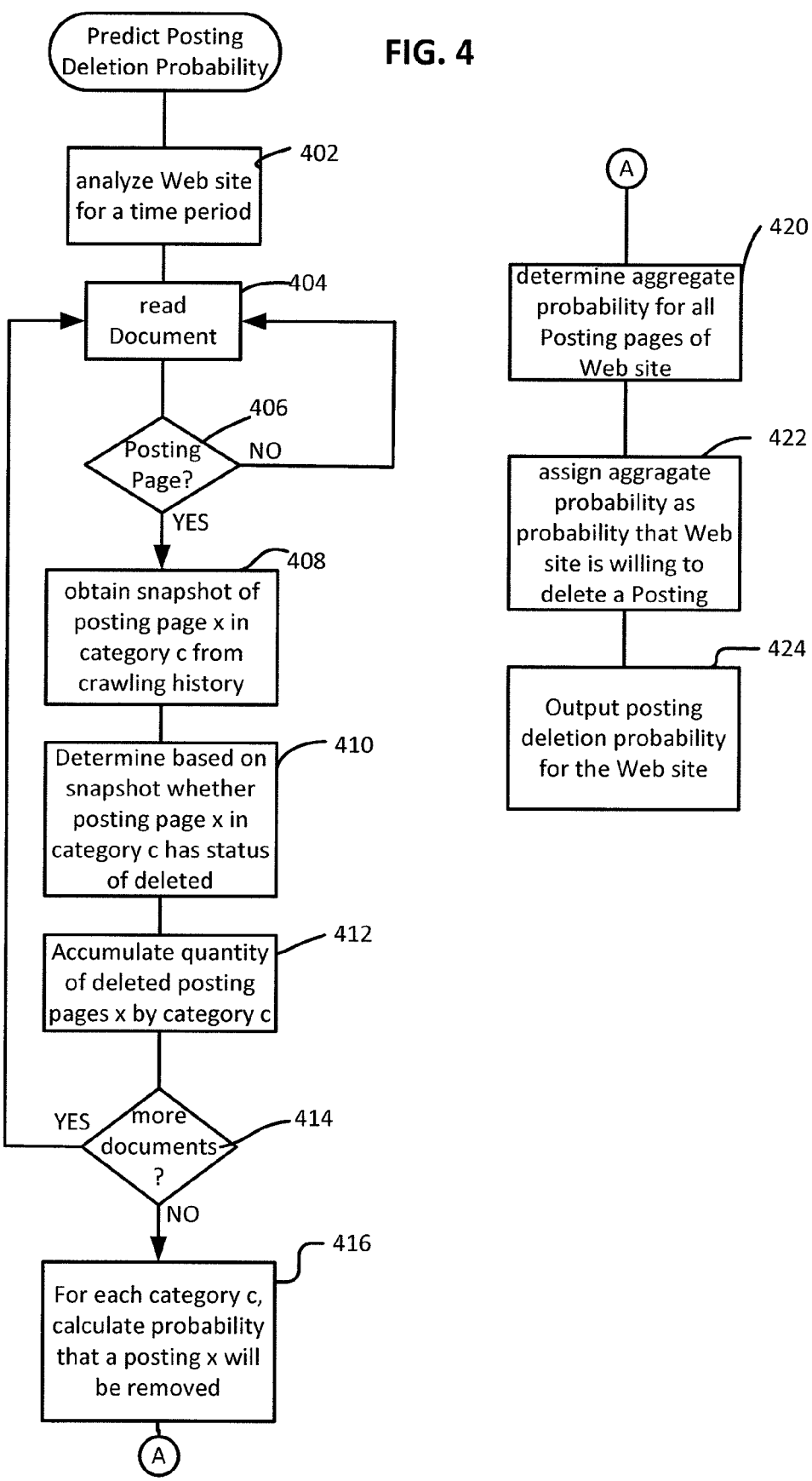
FIG. 4 is a flowchart to predict a posting deletion probability for a Web site.

In addition, the re-crawl determiner 204 can use a probability that a posting page is deleted or removed from a Web site obtained from the re-crawl analyzer 110 in order to determine whether a re-crawl operation will be performed on a Web site. FIG. 4, described below, shows a process of using crawling history information to determine a probability that a posting is deleted or removed from a Web site.

Figure 6:
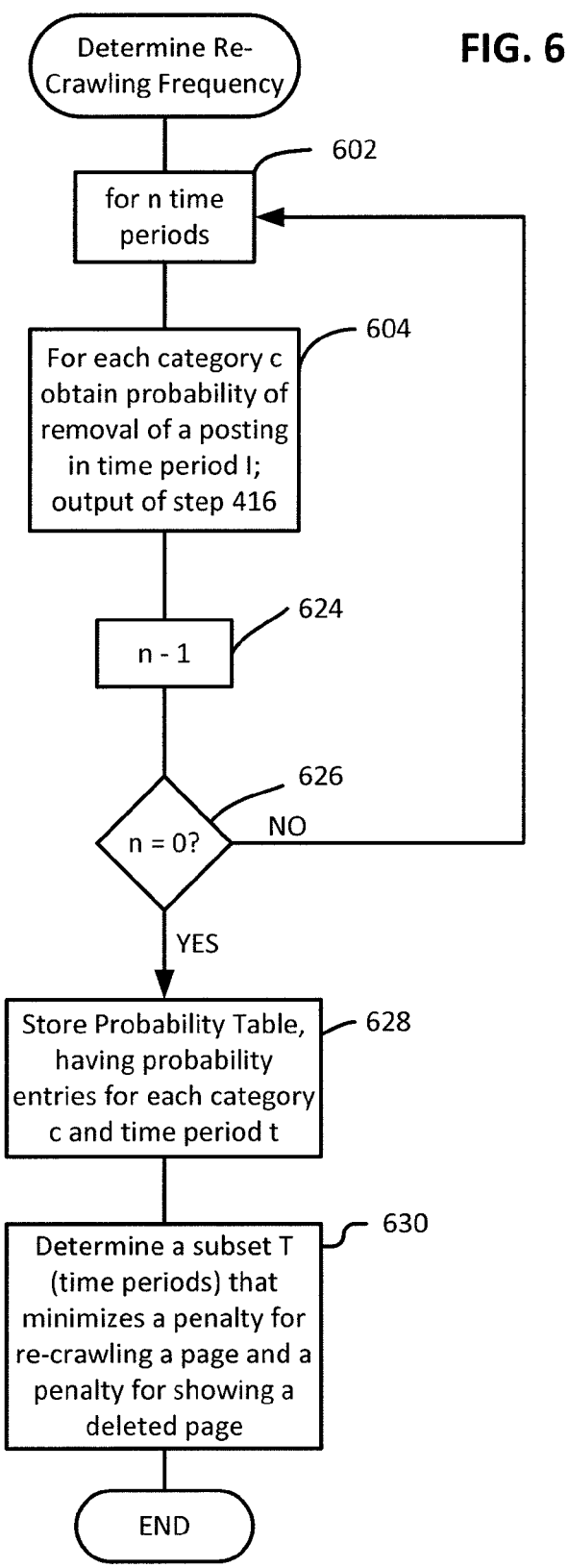
FIG. 6 is a flowchart to determine a re-crawl schedule.

Furthermore, the re-crawl determiner 204 can use re-crawl schedule information obtained from the re-crawl analyzer 110 to delay re-crawling in accordance with the re-crawl schedule. FIG. 6, described below, shows a process of determining the re-crawl schedule for a Web site. When the re-crawl determiner 204 determines that a posting is deleted, an instruction is sent to a Deleter 206 to delete the posting from the indexed database 108.

When the Re-crawler 208 determines that no-further re-crawling will be performed, a status of the Web site is stored to indicate that no further re-crawl is necessary 210.

Figure 3:
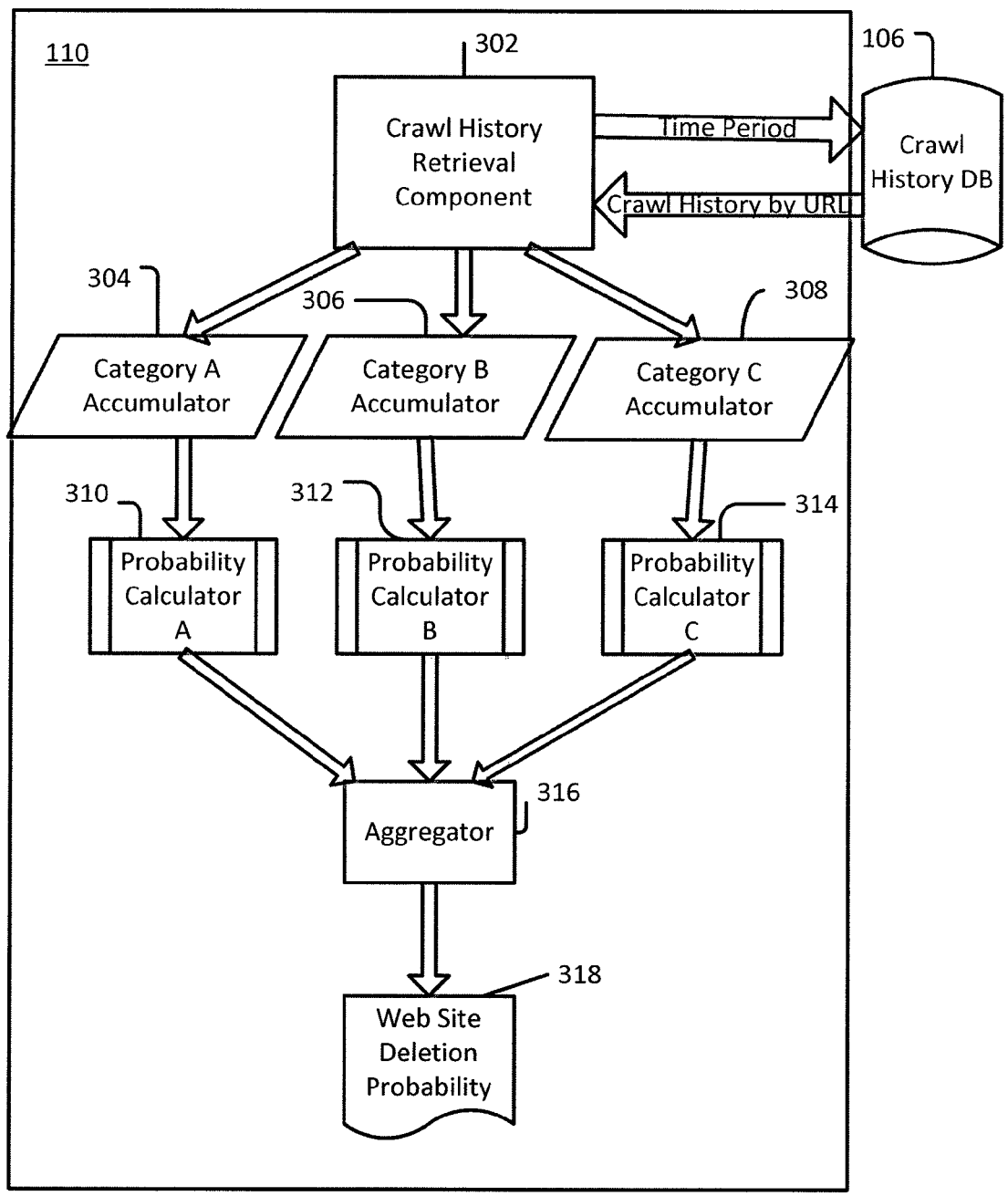
FIG. 3 is a schematic block diagram for a re-crawl analyzer for determining posting deletion probability.

FIG. 3 is a schematic block diagram of the re-crawl analyzer 110 of FIG. 1B for determining a posting deletion probability for a Web site. FIG. 4 shows an associated flowchart for a process of determining a posting deletion probability.

As shown in FIG. 3, the re-crawl analyzer 110 includes a crawl history retrieval component 302 that reads crawl history information for a Web site from crawl history database 106 for a predetermined crawl time period.

The re-crawl analyzer 110 accumulates the number of postings that have been deleted by category in category accumulators 304, 306, 308. The number of category accumulators is based on the number of categories. Category accumulators can be created as a new category is detected. Each category has an associated probability calculator 310, 312, 314, which takes the number of deleted postings in a category as accumulated in a category accumulator and divides the accumulated number by the total number of postings in the category to obtain a probability for that category. Provided category identification, a deletion probability can be determined for posting pages within a category.

The re-crawl analyzer 110 further includes an aggregator 316 that determines an aggregate probability for all categories. The aggregate probability is stored along with the Web site in memory 318, for example a URL, as the probability that the Web site will delete, remove or modify a posting (deletion probability).

Alternatively, the probability that the Web site will delete, or remove a posting page may be determined using a random number generator. For example, a random number may be generated for each posting page of a Web site, and the sum of the generated random numbers can be provided as the aggregate probability.

FIG. 4 is a flowchart for predicting whether or not a posting page is deleted or removed. As shown in FIG. 4, at Step 402, a Web site that has been crawled in a crawl time period is analyzed. A document of the Web site is read from crawl history database 106 at step 404. The document can be a listing page, a posting page, a temporary page, or a miscellaneous page. A listing page typically contains a list of one or more categorized postings. A posting page is a page that is associated with a posting on a listing page. A temporary page can be an error or warning page indicating that a posting does not exist, or may be a redirection page that redirects a user to another page. The entry for a document in the crawl history database 106 is checked to determine if the document is a posting page at step 406. When the document is a posting page, at step 408, a snapshot for the posting page in category c is retrieved from crawl history database 106.

At step 410, the crawling history information for the posting page is analyzed over a crawl time period to determine whether the posting page has a status of deleted. The determination that a page has a status of deleted can be performed based on a page status attribute for a posting page history, such as an HTTP response code, or based on the content of an HTML page. In the latter case, if an HTML page content has a structure that indicates an error page (e.g., by comparison of Document Object Model—DOM), it is determined that the posting page has a status of deleted or removed.

At step 412, the determination that the posting page is deleted or removed, or not is accumulated, in association with the category of the posting page, in a memory of the re-crawl analyzer 110. At step 414, the steps for determining whether a posting page has been deleted or removed are repeated for more documents in the Web site for the crawl time period.

At step 416, after documents in the Web site have been analyzed, the probability that a posting x will be deleted or removed for each category c is calculated. The probability can be calculated as a ratio of the accumulated quantity of deleted or removed posting pages for a category of step 412, divided by the quantity of posting pages analyzed for the category c.

At step 420, an aggregate probability for all posting pages is determined for the Web site and represents the probability that the Web site is going to delete or remove a posting. At step 422, the aggregate probability is assigned to an identifier for the Web site, and can be stored in the crawl history database for the Web site in association with the Web site identifier. At step 424, the deletion/removal probability for that Web site can be output to the re-crawl controller 120, for use in determining whether re-crawling is to be performed at a re-crawl time period. The re-crawl time period that applies to the probability is of the same duration as the crawl time period which the probability was determined.

Figure 5:
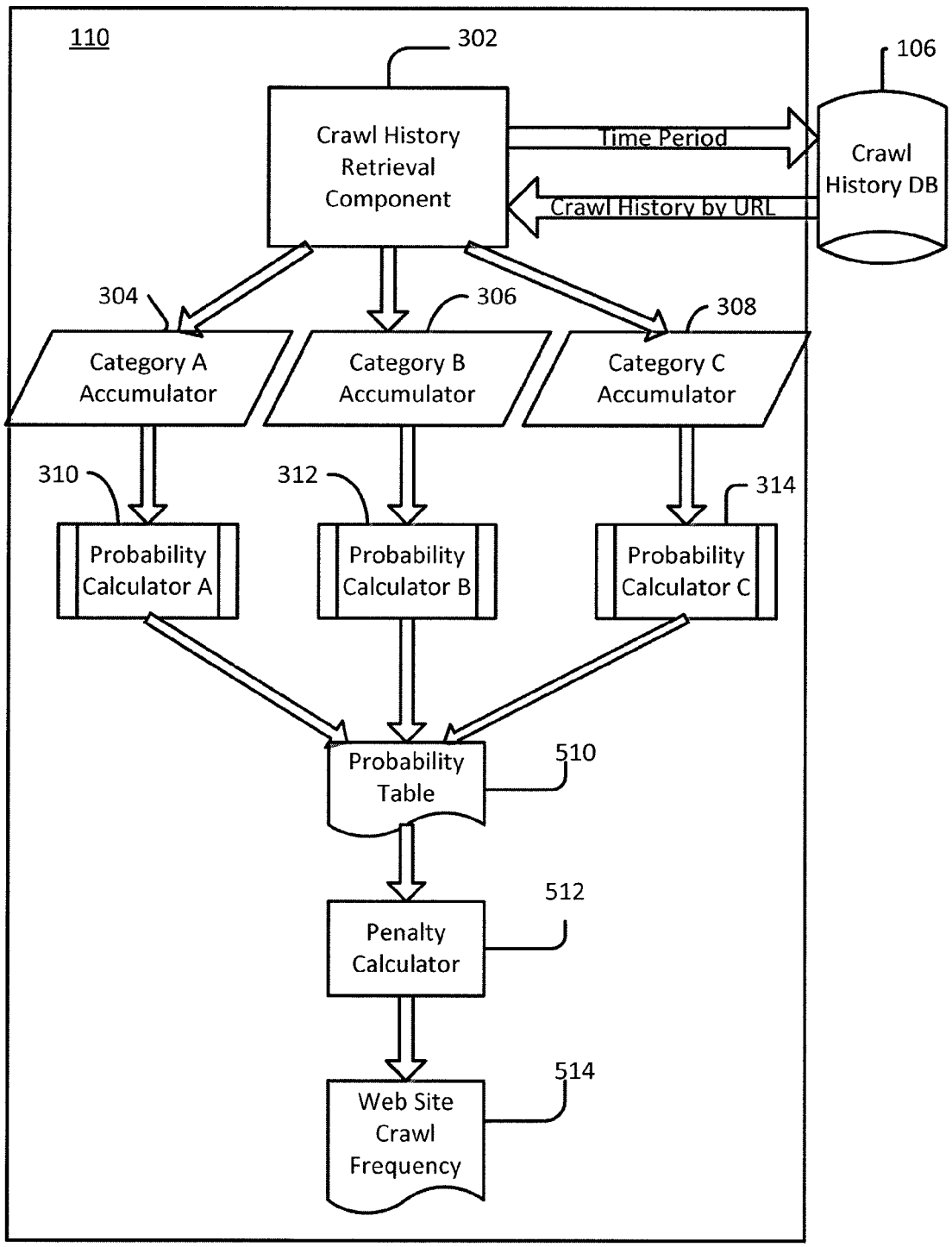
FIG. 5 is a schematic block diagram for determining a re-crawl schedule.

FIG. 5 is a schematic block diagram for re-crawl analyzer 110 for determining a set of re-crawl time periods. FIG. 6 is a flowchart for determining re-crawl time periods. For purposes of this disclosure, a set of re-crawl time periods represents a re-crawl schedule.

As shown in FIG. 5, the re-crawl analyzer 110 includes a crawl history retrieval component 302, category accumulators 304, 306, 308, and probability calculators A, B, C, 310, 312, 314. As explained for FIG. 3, a probability that a posting has been deleted/removed in each category is determined in probability calculators 310, 312, and 314. Although three categories are shown in this example, the number of categories can be as many as there are categories in a Web site. The probabilities for each category are stored in a probability table 510 for a number of previously crawled time periods.

A penalty calculator 512 determines a crawl penalty for various sets of crawled time periods. For example, for a given category, a crawl penalty for various combinations of time periods, such as T1, T2, T3 can be determined. A crawl penalty can be determined as a combination of a penalty for crawling a Web site and a penalty for showing a deleted posting page. A crawl schedule determiner 514 selects a set of crawled time periods that has a minimum crawl penalty. The selected set of crawled time periods is projected into future time periods when a Web site will be re-crawled. For example, if time periods are 1 hour, and a time T2 is in a selected set of crawled time periods, the Web site will be re-crawled in T2=1 hour from the time the determination is performed.

FIG. 6 is a flowchart for determining re-crawl time periods to next re-crawl a Web site (re-crawl schedule). As shown in FIG. 6, at step 602, re-crawl schedule is to be determined for a Web site based on a past n time periods, as in step 602. At Step 604, for each category c, a probability that a posting has been removed is calculated. Steps 604 and 624 are performed for each time period for each past n time periods, according to decision step 626. At step 628, the probability that a Web site is going to delete/remove a posting in each category C for each of past n time periods i is saved in a probability table. At step 630, a subset of past time periods T (for example, {t1, t2, t8}) is determined from among past time periods and categories in the table in order to establish a novel re-crawling schedule that minimizes a penalty function.

The penalty function can consist of a penalty, having a weight of p1, for re-crawling a page and a penalty, having a weight of p2, for showing a deleted page to a user. Having a penalty for re-crawling a page ensures that re-crawling a page is performed the minimum number of times necessary. Having a penalty for showing a deleted page to a user ensures that the time to show a deleted page to a user is minimized. Values for weights p1 and p2 can be determined empirically. Weights p1 and p2 enable giving of more, less or an equal weighting to penalizing re-crawling of a Web site versus showing a deleted page. For example, a high value for p1 implies that emphasis should be given to avoiding re-crawling a Web site. A high value for p2 means that emphasis should be given to avoiding showing a deleted page. Lower values for weights p1 or p2 imply a tolerance for error on the part of re-crawling Web sites that do not require re-crawling, or showing some deleted pages. In most cases it is sufficient to set p1 and p2 at equal values, for example 0.5. Values of p1 and p2 may later be adjusted empirically.

In an embodiment, the duration of a past time period is the same as the time period that is scheduled to perform re-crawl. For example, if a time period of one hour is the duration of a past time period over which a crawl history is analyzed, time periods for performing re-crawl will be in increments of one hour. If a past time period t2 is in the subset of past time periods T, a re-crawl schedule will include a re-crawl at the beginning of the re-crawl schedule.

In another embodiment, the duration of a past time period can be different from the duration of scheduled re-crawl time periods.

The penalty function represents a trade-off between the two penalties to determine a subset T to minimize the overall penalty, and can be determined according to the following formula.

$$PENALTY(C, T) = p_1 * |T| + p_2 * \sum_{i=1}^{n} (P(c, i) * F(T, i))$$ FORMULA 1 where $$F(T, i) = \begin{cases} 0 & i \in T \\ j - i & i \notin T \end{cases} \text{(smallest } j \in T \text{ satisfy } j > i\text{)}$$

In the above formula, p1*|T| models the crawling penalty. Each re-crawling page takes p1 penalty. The second part of the formula p2*SIGMA models the penalty of showing deleted pages to the user. As mentioned above, p1 and p2 are predetermined weighting values between 0 and 1.

Example 1

An average probability table for deleting a posting for each category may be produced using steps 404-422, as shown in FIG. 4. Using steps in FIG. 4, a crawl history of a Web site is analyzed for regular intervals, for example every hour, to determine for each hour whether a posting has been deleted or not. It is noted that the time period for analyzing the crawl history of a Web site can be set based on the amount of data contained in the crawling history database 106 to ensure a sufficient statistical sample.

As an example, assume that an average probability table has been generated using steps in FIG. 4 for two categories c1 and c2, where the unit of time is hours (time period=1 hr).

| P(C, t) | t = 1 | t = 2 | t = 3 | t = 4 | t = 5 | t = 6 | t = 7 | t = 8 |
|---------|-------|-------|-------|-------|-------|-------|-------|-------|
| C1      | 0.2   | 0.1   | 0.1   | 0.3   | 0.05  | 0.05  | 0.05  | 0.05  |
| C2      | 0.4   | 0.2   | 0.1   | 0.05  | 0.05  | 0.05  | 0.02  | 0.02  |

Although the example is for two categories, it is understood that a probability table can be generated for one category, or several categories. Provided a probability table for n time periods, penalties can be determined for a category C and a set of crawled time periods T using Formula 1.

A value of 0.1 at the position P(C1, t=2) in the table means that 10% postings have been deleted during the time period from time t=1 to time t=2.

A value of 0.2 at the position P(C2, t=2) means that 20% postings have been deleted during the time period from time t=1 to time t=2.

Various combinations of time periods can be selected to determine a subset of time periods that have the minimum penalty. In an example embodiment, all possible combinations of time periods can be selected, and a penalty can be determined for each combination. In an alternative embodiment, random samples of combinations of time periods are selected, and a penalty is determined for the random samples. For purposes of explaining a calculation using the penalty formula, a subset of time periods are selected as T={t2, t4, t8} for category C1.

Using the formula, the penalty for re-crawling would be p1*3. The penalty for showing a deleted listing is {p2*0.2* (2−1)}+{p2*0.1*(4−3)}+{p2*0.05*(8−5)+p2*0.05*(8−6)+ p2*0.05*(8−7)}

In this example, the first part p2*0.2*(2−1) is the loss for t1. In other words, there are 20% postings deleted over the time period t2−t1. Also, the example shows that 5% (0.05) postings have been deleted during the time period t8−t5. Thus, the loss is p2*0.05*(8−5). The overall PENALTY(C1, T) is p1*3+ p2*0.6.

If the penalty for C1 and set of time periods {t2, t4, t8} is a minimum penalty for various sets of time periods for category C1, the re-crawl schedule will be set as time periods t2, t4, t8 from the time of determining the re-crawl schedule at the last re-crawl time. For example, in the case that the duration of a past time period is the same as a scheduled re-crawl time period, the re-crawl schedule would be t2=1 hr, t4=3 hr, and t8=7 hr from the beginning of the schedule (given that t1 has a duration of 1 hr beginning from time point zero, t2 begins at the second hour, having a duration of one hour, and so on).

Example 2

In another example, assume that a subset T={t1, t2, t6, t8} is selected for C2. The penalty for re-crawl is p1*4.

The penalty of showing a deleted posting is:

$$p2*0.05*(6-3)+p2*0.05*(6-4)+p2*0.05*(6-5)+\\p2*0.02*(8-7)=(0.15+0.1+0.05+0.02)\\*p2=0.32*p2$$

The overall PENALTY(C2, T) is: p1*4+p2*0.32.

Figure 7:
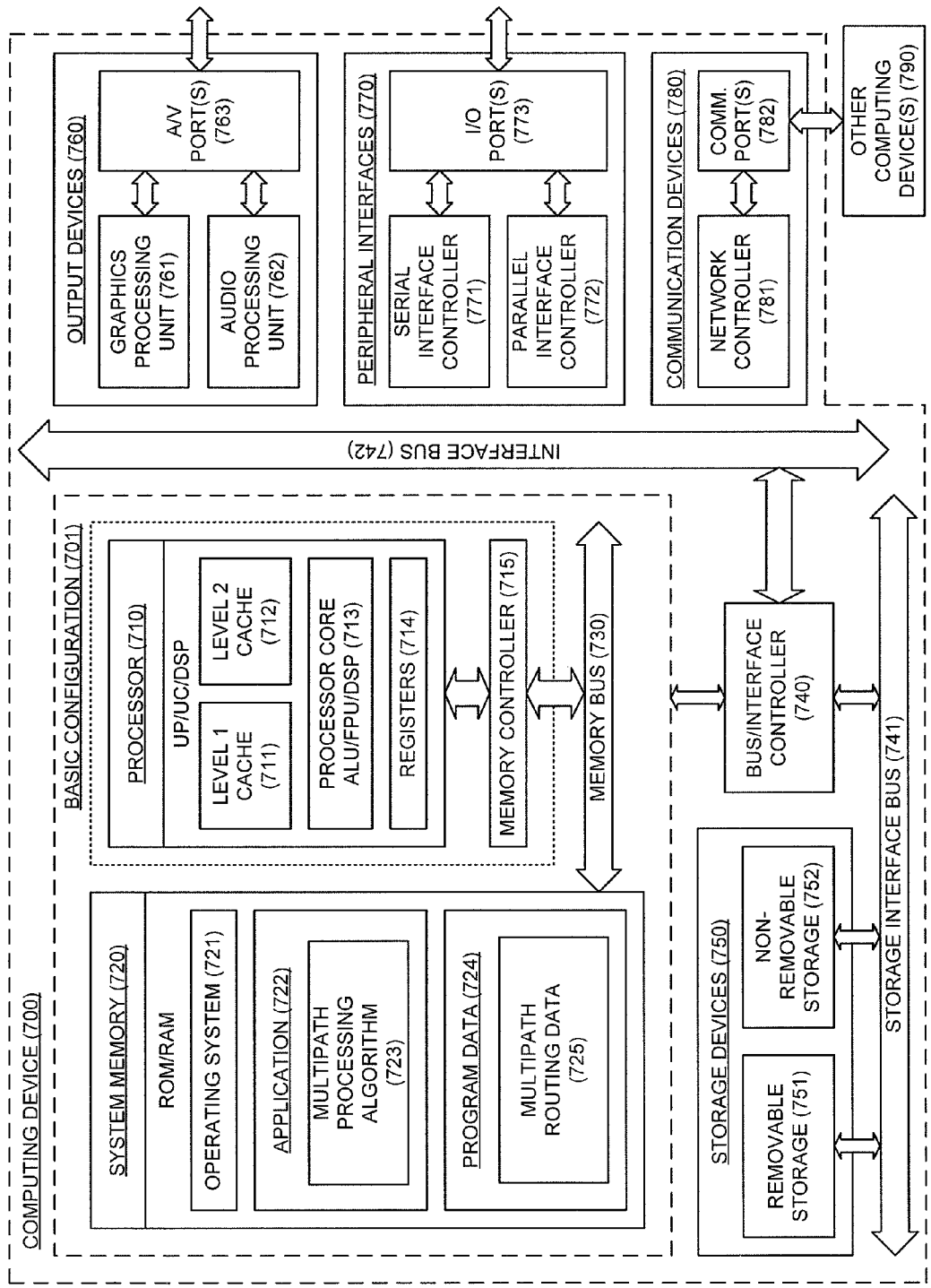
FIG. 7 is a block diagram of an example computer that performs operations in flowcharts of FIGS. 3 and 4.

FIG. 7 is a block diagram illustrating an example computing device 700 that is arranged for crawling and re-crawling listing Web pages' deletion. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes a re-crawl analysis algorithm 723. Program Data 724 includes re-crawl data 725, as will be further described below. In some embodiments, application 722 can be arranged to operate with program data 724 on an operating system 721. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which can be configured to communicate to various external devices such as a display or speakers via one or more AN ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   one or more processors; and
   a memory coupled to the one or more processors and storing instructions that when executed by the one or more processors, cause the system to perform operations comprising:
      obtaining crawl history data for a Web site, wherein the Web site comprises one or more Web pages that are each associated with a category,
      determining a status of the one or more Web pages from the crawl history data,
      determining, for each category, a total quantity of Web pages associated with the category that have a status of deleted,
      calculating, for each category, a probability that another Web page that is associated with the category will be removed based on the total quantity of the Web pages that have a status of deleted for the category, and
      storing, for each category, data associating the calculated probability with the category and the Web site.

2. The system of claim 1, the memory further storing instructions that, when executed by the one or more processors, cause the system to perform operations comprising aggregating the probabilities of the respective categories, and wherein the storing stores data associating the aggregate probability with the Web site.

3. The system of claim 1, wherein each of the Web pages is a posting page for an ad for a product or service, where the product or service appears in a listing page among products or services of the same type.

4. The system of claim 1, wherein the memory further stores instructions that, when executed by the one or more processors, cause the system to perform operations comprising using the stored probabilities to determine a re-crawl schedule that minimizes a cost associated with re-crawling a Web site and a cost for showing deleted Web pages.

5. A system comprising:
   one or more processors; and
   a memory coupled to the one or more processors and storing instructions stored thereon that, when executed by the one or more processors, cause the system to perform operations comprising:
      obtaining crawl history data for a plurality of previous time periods for a Web site, wherein the Web site comprises a plurality of Web pages,
      determining a status of each of the plurality of Web pages for each of the previous time periods,
      determining, for each previous time period, a total quantity of Web pages that have a status of deleted,
      calculating probabilities that other Web pages of the Web site will be removed within each respective re-crawl time period based on the total quantity of the Web pages that have a status of deleted, determining, for a plurality of sets of the previous time periods, a respective crawl score as a combination of a first score for crawling the Web site and a second score for showing a deleted Web page, the second score being based on the calculated probabilities, and determining a re-crawl schedule based on the crawl scores.

6. The system of claim 5, wherein the re-crawl schedule is determined by selecting a set of the previous time periods among the plurality of sets of the previous time periods.

7. The system of claim 5, wherein some Web pages of the Web site include categories, and said one or more of said Web pages are posting pages that are associated with one or more of the categories, the obtaining further comprises obtaining a category of each respective posting page, wherein the determining a total quantity comprises determining a total quantity of posting pages that have a status of deleted for a respective category, and wherein the calculating probabilities comprises calculating probabilities that other posting pages of the Web site will be removed within the respective re-crawl time periods for each of the respective categories.

8. The system of claim 7, wherein the crawl score is a score for a category c and a set of one or more previous time periods T, the crawl score being the sum of the first score and the second score, the first score being defined as $p_1 * |T|$ and the second score being defined as $$p_2 * \sum_{i=1}^{n} (P(c, i) * F(T, i)),$$

where $$F(T, i) = \begin{Bmatrix} 0 & i \in T \\ j - i & i \notin T \end{Bmatrix} (\text{smallest } j \in T \text{ satisfy } j > i),$$

$p_1$ is a weight for unnecessarily crawling a page,
$p_2$ is a weight for showing a deleted page, and
i and j are previous time periods.

9. The system of claim 8, wherein the re-crawl schedule is determined by selecting a set of the previous time periods having a minimum crawl score among the plurality of sets of the previous time periods.

10. A method performed by one or more processors, the method comprising:
obtaining crawl history data for a Web site, wherein the Web site comprises one or more Web pages that are each associated with a category;
determining a status of the one or more of the Web pages from the crawl history data;
determining, for each category, a total quantity of Web pages associated with the category that have a status of deleted;
calculating, for each category, a probability that another Web page that is associated with the category will be removed based on the total quantity of the Web that have a status of deleted for the category; and
storing, for each category, data associating the calculated probability with the category and the Web site.

11. The method of claim 10, further comprising aggregating the probabilities of the respective categories, and wherein the storing stores data associating the aggregate probability with the Web site.

12. The method of claim 10, wherein the Web page is a posting page for a product or service, where the product or service appears in a listing page among products or services of the same type.

13. The method of claim 10, further comprising using the stored probabilities to determine a re-crawl schedule that minimizes a cost associated with re-crawling a Web site and a cost for showing deleted Web pages.

14. A method performed by one or more processors, the method comprising:
obtaining crawl history data for a plurality of previous time periods for a Web site, wherein the Web site comprises a plurality of Web pages;
determining a status of each of the plurality of Web pages for each of the previous time periods;
determining, for each previous time period, a total quantity of Web pages that have a status of deleted;
calculating probabilities that other Web pages of the Web site will be removed within each respective re-crawl time period based on the total quantity of the Web pages that have a status of deleted;
determining, for a plurality of sets of the previous time periods, a respective crawl score as a combination of a first value for crawling the Web site and a second value for showing a deleted Web page, the second value being based on the calculated probabilities; and
determining a re-crawl schedule based on the crawl scores.

15. The method of claim 14, wherein the re-crawl schedule is determined by selecting a set of the previous time periods among the plurality of sets of the previous time periods.

16. The method of claim 14, wherein some Web pages of the web site include categories, and said one or more of said Web pages are posting pages that are associated with one or more of the categories, the obtaining further comprises obtaining a category of each respective posting page, wherein the determining a total quantity comprises determining a total quantity of posting pages that have a status of deleted for a respective category, and wherein the calculating probabilities comprises calculating probabilities that other posting pages of the Web site will be removed within the respective re-crawl time periods for each of the respective categories.

17. The method of claim 16, wherein the crawl score is a score for a category c and a set of one or more previous time periods T, the crawl score being the sum of the first value and the second value, the first value being defined as $p_1 * |T|$ and the second value being defined as $$p_2 * \sum_{i=1}^{n} (P(c, i) * F(T, i)),$$

where $$F(T, i) = \begin{Bmatrix} 0 & i \in T \\ j - i & i \notin T \end{Bmatrix} (\text{smallest } j \in T \text{ satisfy } j > i),$$

$p_1$ is a weight for unnecessarily crawling a page,
$p_2$ is a weight for showing a deleted page, and
i and j are previous time periods.

18. The method of claim 17, wherein the re-crawl schedule is determined by selecting a set of the previous time periods having a minimum crawl score among the plurality of sets of the previous time periods.

19. A computer-readable storage medium storing a computer program that, when executed by a computer, performs the steps of:
- obtaining crawl history data for a Web site, wherein the Web site comprises one or more Web pages that are each associated with a category;
- determining a status of one the or more Web pages from the crawl history data;
- determining, for each category, a total quantity of Web pages associated with the category that have a status of deleted;
- calculating, for each category, a probability that another Web page that is associated with the category will be removed based on the total quantity of the Web pages that have a status of deleted for the category; and
- storing, for each category, the data associating the calculated probability with the category and the Web site.

20. A computer-readable storage medium storing a computer program that, when executed by a computer, performs the steps of:
- obtaining crawl history data for a plurality of previous time periods for a Web site, wherein the Web site comprises a plurality of Web pages;
- determining a status of each of the plurality of Web pages for each of the previous time periods;
- determining, for each previous time period, a total quantity of posting pages that have a status of deleted;
- calculating probabilities that other posting pages of the Web site will be removed within each respective re-crawl time period based on the total quantity of the Web pages that have a status of deleted;
- determining, for a plurality of sets of the previous time periods, a respective crawl score as a combination of a first value for crawling the Web site and a second value for showing a deleted Web page, the second value being based on the calculated probabilities; and
- determining a re-crawl schedule based on the crawl scores.

* * * * *

UNITED STATES PATENT AND TRADEMARK OFFICE
CERTIFICATE OF CORRECTION

PATENT NO. : 8,862,569 B2  
APPLICATION NO. : 13/348438  
DATED : October 14, 2014  
INVENTOR(S) : Cheng Xu et al.

Page 1 of 1

It is certified that error appears in the above-identified patent and that said Letters Patent is hereby corrected as shown below:

In the Claims

In column 12, line 18, in claim 1, delete "that" and insert -- that, --, therefor.

In column 15, line 7, in claim 19, delete "one the" and insert -- the one --, therefor.

Signed and Sealed this
Tenth Day of February, 2015

Michelle K. Lee
*Deputy Director of the United States Patent and Trademark Office*